Dec. 4, 1928.
V. D. HENNESSEY
COMBINATION MIXING VALVE
Original Filed July 27, 1925  2 Sheets-Sheet 1
1,693,758
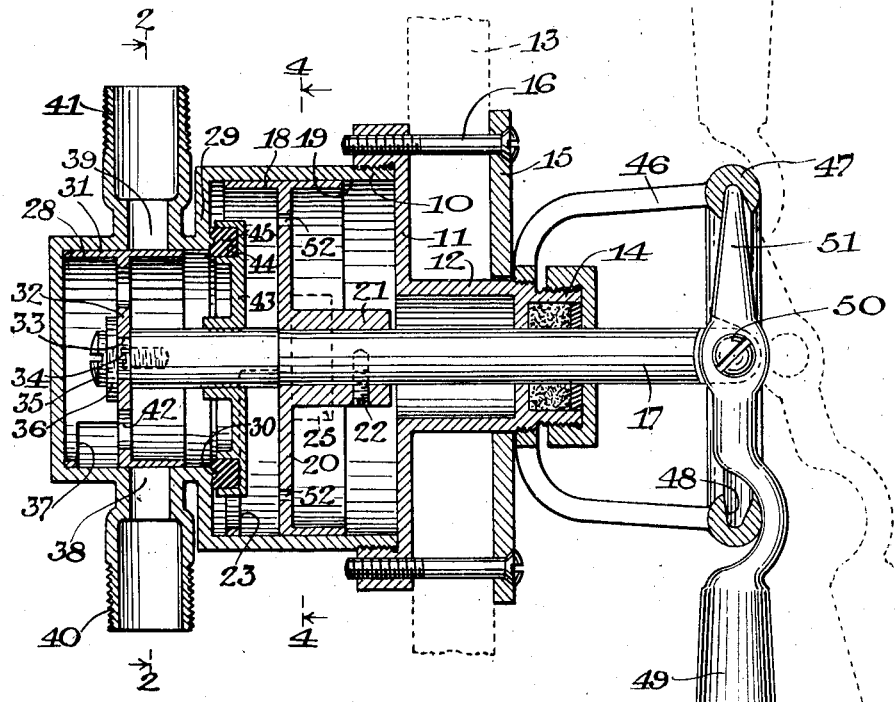
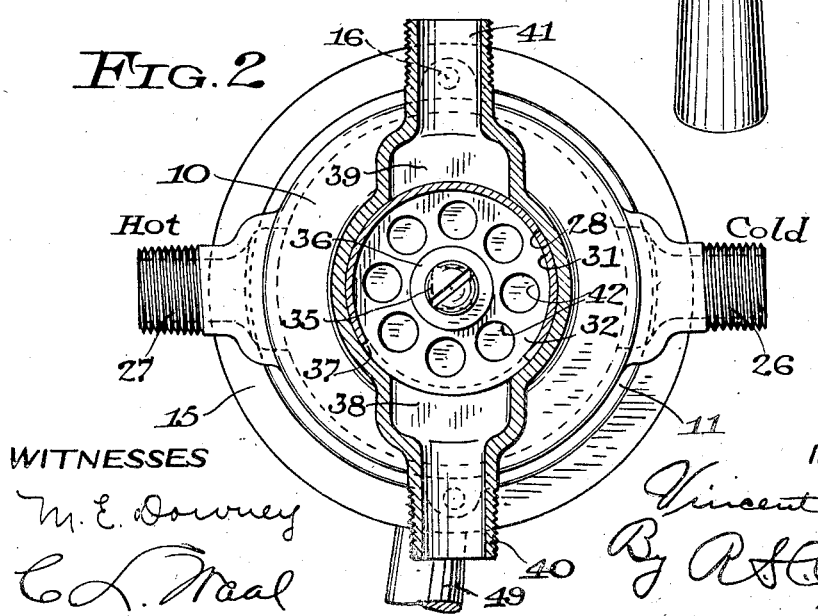
WITNESSES
INVENTOR
Vincent D. Hennessey
By R. S. Caldwell
ATTORNEY Dec. 4, 1928.
V. D. HENNESSEY
1,693,758
COMBINATION MIXING VALVE
Original Filed July 27, 1925    2 Sheets-Sheet  2
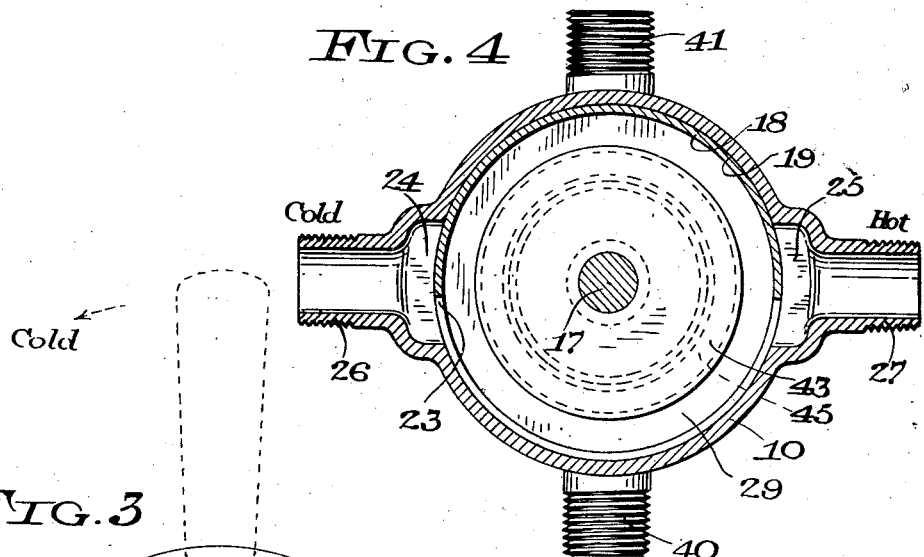
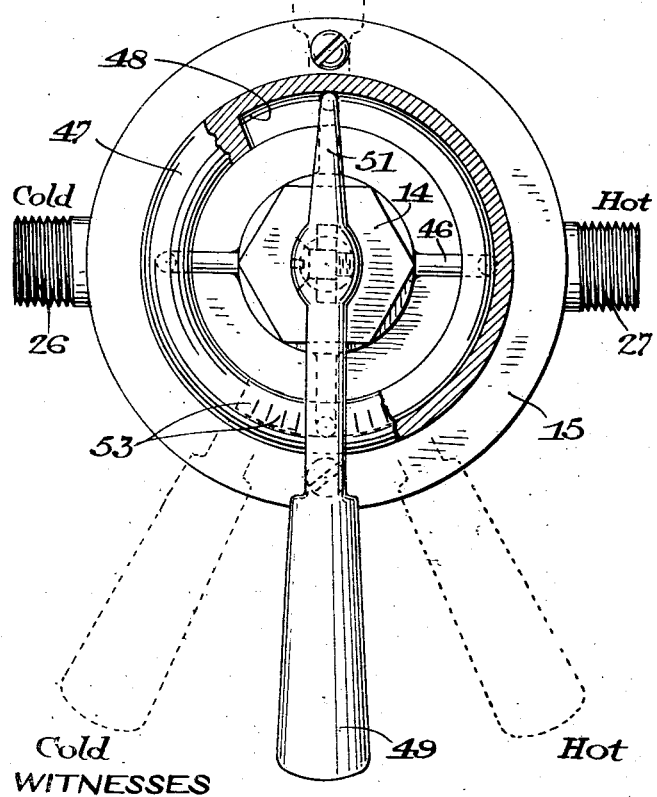
WITNESSES
INVENTOR
ATTORNEY Patented Dec. 4, 1928.

1,693,758

UNITED STATES PATENT OFFICE.

VINCENT D. HENNESSEY, OF MILWAUKEE, WISCONSIN.

COMBINATION MIXING VALVE.

Application filed July 27, 1925, Serial No. 46,333. Renewed April 2, 1928.

The invention relates to valves for commingling fluids and for controlling their discharge.

An object of the invention is to provide a valve for commingling, in variable proportions, dissimilar fluids, such as hot and cold water, and for selectively controlling the discharge into a plurality of conduits.

Another object of the invention is to provide a valve of this character in which the functions of variable proportioning, variable flow and selective discharge are under the control of a single actuator.

A further object of the invention is to provide novel actuator means for manipulating the valve.

A further object of the invention is to perfect details of construction generally.

The invention further consists in the several features hereinafter set forth and more particularly defined by the annexed claims.

In the accompanying drawings, Fig. 1 is a longitudinal sectional view through a valve embodying the invention;

Fig. 2 is a transverse sectional view thereof taken on the line 2—2 of Fig. 1 with valve elements in their open position;

Fig. 3 is a front end view of the valve, parts being broken away and parts being shown in section; and Fig. 4 is a transverse sectional view taken on the line 4—4 of Fig. 1 with valve elements shown in their open position.

The invention more particularly contemplates the provision of a combination valve for alternatively supplying a tub and shower with a variable flow of water at a suitable temperature.

In the drawings, the numeral 10 designates a valve body or casing which is closed at one end by a cover 11 having a reduced cylindrical portion 12 adapted to project through a wall 13 and provided with a stuffing box 14 at its forward end. A wall plate 15 fits loosely over the cylindrical portion of the cover 11 and is adapted to clampingly abut against the outer face of the wall by means of screws 16 passing therethrough and threaded into the cover 11 adjacent its periphery.

A valve stem 17 is disposed axially within the valve casing 10 and projects forwardly through the stuffing box 14. A cylindrical valve sleeve 18 is slidably and rotatably mounted in close fitting relation within a bore 19 in the valve casing and is provided with a web 20 and a central hub 21 which is fixedly secured to an intermediate portion of the valve stem 17, as by means of a screw 22. The sleeve 18 is provided at one side of its web with an arcuate port-forming slot 23 which extends almost one-half way around the periphery of the sleeve, as seen in Fig. 4. The slot 23 is adapted to register, as hereinafter described, with diametrically opposite inlet ports 24 and 25 in the valve casing, preferably rectangular in shape and communicating with hollow threaded bosses 26 and 27, respectively, to which piping connections (not shown) may be made.

The valve casing at its inner end is provided with a bore 28 concentric with the bore 19 but somewhat smaller in diameter in order to afford a shoulder 29 at the inner edge of which is placed an annular rib 30 forming a valve seat. A cylindrical valve sleeve 31 is slidably and rotatably mounted in close fitting relation within the bore 28 and carries a web 32 provided with a central polygonal opening 33 which fits over the reduced polygonal end 34 of the valve stem 17 to prevent relative rotation between these parts, the sleeve being fixedly secured to the stem by a screw 35 passing through an interposed washer 36.

The sleeve 31 is provided with an arcuate port-forming slot 37 adapted to register alternatively, as hereinafter described, with diametrically opposite discharge ports 38 and 39 in the casing, preferably rectangular in shape and communicating with hollow threaded bosses 40 and 41, respectively, to which pipe connections (not shown) may be made. The web 32 of the sleeve 31 is provided with a number of openings 42 to afford communication between opposite sides of the web. The valve sleeves 18 and 31 are preferably made of softer metal than the valve casing so that they may be inexpensively replaced after wear has occurred.

The interior spaces of the valve sleeves 18 and 31 form a transfer passage which has an entrance at the slot 23 in the valve sleeve 18 and an exit at the slot 37 in the valve sleeve 31. The valve sleeves 18 and 31, which are fixedly secured to the valve stem 17 for displacement as a whole in rotary and axial directions, constitute, in effect, a single valve piston.

A packing retainer disk 43 is non-rotatably secured to the valve stem 17 at a point intermediate the valve sleeves 18 and 31 and is provided with an annular groove 44 at its periphery carrying a packing ring 45 adapted to abut against the valve seat 30, so that when the ring is seated leakage of water is prevented between the inlet ports 24 and 25 and the discharge ports 38 and 39.

A cage 46 is secured to the cover 11 and includes a ring 47 spaced outwardly from the wall and having an inner groove 48 formed therein. A handle 49 is pivotally mounted on the forward end of the valve stem 17, as by a screw 50, and is provided with an extension 51 entering the groove 48 to form a floating pivotal connection and also to serve as a pointer. The groove 48 need not extend completely around the ring 47 but may terminate as shown in Fig. 3 to form stops each determining one extreme position of the handle in its two paths of movement, as hereinafter described.

In the closed position of the valve, as shown in Fig. 1, the packing ring 45 engages the valve seat 30 and the valve sleeve 18 has been moved axially inwardly to place the arcuate slot 23 in the sleeve out of registration with the inlet ports 24 and 25. As some seepage may occur from the inlet ports 24 and 25 into the forward portion of the valve casing, openings 52 are provided in the web 20 to avoid trapping of water in front of the web, which would interfere with the forward movement of the sleeve. When the valve is closed by the rearward axial displacement of the valve piston, the inlet ports 24 and 25 are not only placed out of communication with the discharge ports, but are also placed out of communication with each other, so that any difference of pressure existing in the inlet ports will not result in a flow of liquid between these ports.

The temperature of the water to be discharged from the valve may be preselected by angularly displacing the handle 49 to a position between the lower dotted line extreme positions shown in Fig. 3, the full line position of the handle in this view corresponding to a medium temperature of water. To aid the operator in making such adjustment, suitable calibrations 53 may be placed on the ring 47 of the cage 46. For opening the valve, the handle 49 is swung outwardly about the end of the extension 51 pivotally bearing in the groove 48, to the lower dotted line position shown in Fig. 1, or to some intermediate position, whereupon the packing ring 45 is moved off the valve seat 30 and the arcuate slot 23 in the valve sleeve 18 is placed in register with the ports 24 and 25 of the valve casing, as shown in Fig. 4. In this view, the exposed area of the inlet ports is about equal, but by angularly displacing the sleeve 18 with the handle 49 these ports may be exposed unequal amounts, or one port may be entirely closed, thus controlling the temperature of the water within the valve casing, wherein the space between the shoulder 29 and web 20 of the sleeve 18 forms a mixing chamber. The forward axial movement of the valve stem 17 also places the arcuate slot 37 of the sleeve 31 in register with the lower discharge port 38, whereupon water will flow from the inlet ports past the valve seat 30, through the apertured web 32, and through the slot 37 into port 38. The rate of flow of the discharged water may be suitably regulated by the angular placement of the handle 49 in a given plane through the valve stem 17 without changing the temperature of the water. This result is possible of attainment since the axial displacement of the piston or valve sleeve assembly is independent of its rotary displacement, although effected by the same common operating means.

The lower threaded boss 40 may be connected to a tub while the upper boss 41 may be connected to a shower. When it is desired to use the shower the handle 49 is swung to the upper dotted line position of Figs. 1 and 3, whereupon the slot 37 in the sleeve 31 is adapted to register with the upper port 39 when the sleeve is moved axially forward. The path of movement of the handle 49 for adjustment of temperature is of the same extent in both its upper and lower positions, as the inlet ports are diametrically opposite. When shifting the handle from one path of movement to the other the transition movement of the handle can only be effected between the "cold" extremes of the two paths, as indicated in Fig. 3, so that danger of scalding will be avoided should the valve be accidentally opened during the transition.

What I claim as new and desire to secure by Letters Patent is:

1. In a mixing valve, the combination of a valve casing having inlet and discharge ports, a valve member assembly disposed within said casing for independent displacement as a whole in rotary and axial directions and having an inlet opening adapted to register with said inlet ports and a discharge opening adapted to selectively register with said discharge ports, and common operating means for said valve member assembly having spaced paths of movement for controlling in each path the admission of fluid from said inlet ports in variable proportions and quantities and for selectively effecting the registration of said discharge opening with a discharge port by alternative placement in said paths of movement.

2. In a mixing valve, the combination of a valve casing having a pair of diametrically opposite inlet ports and a pair of diametrically opposite discharge ports spaced axially therefrom, a rotatable valve member disposed within said casing for controlling the admission of fluid from said inlet ports in variable proportions, a second valve member disposed within said casing and having an opening adapted to selectively register with said discharge ports, and common operating means for actuating said valve members.

3. In a mixing valve, the combination of a valve casing having inlet and discharge ports communicating with axially spaced differential cylinder bores forming a valve seat between them, a rotatable and axially movable valve member disposed within one of said bores for controlling the admission of fluid from said inlet ports in variable proportions and quantities, a second rotatable valve member disposed within the other bore and having an opening for selectively controlling the discharge of fluid from said discharge ports, a third valve member adapted to engage said valve seat for sealing the path of flow between said inlet and discharge ports, and a common operating member disposed axially within said casing and having said valve members secured thereto for controlling their operative positions.

4. In a mixing valve, the combination of a valve casing having inlet and discharge ports, a rotatable valve member disposed within said casing for controlling the admission of fluid from said inlet ports in variable proportions, a second valve member rotatably disposed within said casing and having an opening adapted to selectively register with said discharge ports, and a common actuating member secured to said valve members for effecting their rotation and axial movement, said second valve member being axially movable to a position in which said discharge opening is out of registration with said discharge ports.

5. In a mixing valve, the combination of a valve casing having ports therein, valve means disposed within said casing and axially and rotatably mounted therein for controlling the flow of fluid therethrough in variable proportions and quantities, a valve stem disposed axially within said casing and connected to said valve means, a handle pivotally mounted intermediate its ends on said valve stem to swing in an axial plane through said stem, and a stationary ring member secured to said casing and having an inner groove receiving one end of said handle to permit axial and angular displacement of said valve stem by said handle.

6. In a mixing valve, the combination of a valve casing having inlet and discharge ports, valve piston means disposed within said casing for independent displacement as a whole in rotary and axial directions and having a transfer passage adapted to register with said inlet ports and with a selected discharge port, and common operating means for said valve piston means having spaced paths of movement for controlling in each path the admission of fluid from said inlet ports in variable proportions and quantities and for selectively effecting the registration of said transfer passage with a discharge port for alternative placement in said paths of movement.

7. In a mixing valve, the combination of a valve casing having inlet and discharge ports, valve piston means movable within said casing for independent rotation and axial displacement and having a transfer passage registrable with said inlet and discharge ports, and common operating means for effecting both movements of said piston means, one of said movements of said piston means effecting variable closure of said inlet ports to provide variable proportions of fluids entering said transfer passage and the other of said movements of said piston means effecting variable closure of the ports to control the volume of discharged fluid.

8. In a mixing valve, the combination of a valve casing having inlet and discharge ports, valve piston means movable within said casing for independent rotation and axial displacement and having a transfer passage registrable with said inlet ports and with a selected one of the discharge ports, and common operating means for effecting both movements of said piston means, one of said movements of said piston means effecting variable closure of said inlet ports to provide variable proportions of fluids entering said transfer passage and the other of said movements of said piston means effecting variable closure of the ports to control the volume of discharged fluid.

9. In a mixing valve, the combination of a valve casing having inlet and discharge ports, valve piston means movable within said casing for independent rotation and axial displacement and having a transfer passage registrable with said inlet ports and with a selected one of the discharge ports, and common operating means for effecting both movements of said piston means, the rotary movement of said piston means effecting variable closure of said inlet ports to provide variable proportions of fluids entering said transfer passage and the axial movement of said piston means effecting variable closure of the ports to control the volume of discharged fluid.

In testimony whereof I affix my signature.

VINCENT D. HENNESSEY.